(12) United States Patent
Bishop et al.

(10) Patent No.: US 7,823,020 B2
(45) Date of Patent: Oct. 26, 2010

(54) SYSTEM AND METHOD FOR APPLYING A DESTRUCTIVE FIRMWARE UPDATE IN A NON-DESTRUCTIVE MANNER

(75) Inventors: Bradley W. Bishop, Rochester, MN (US); Wayne A. Britson, Rochester, MN (US); Matthew S. Spinler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 11/468,326

(22) Filed: Aug. 30, 2006

(65) Prior Publication Data

US 2008/0126778 A1    May 29, 2008

(51) Int. Cl.
*G06F 11/00* (2006.01)

(52) U.S. Cl. ............... 714/36; 709/220; 713/2; 717/168

(58) Field of Classification Search ............ 714/36; 713/1, 2, 100; 717/168, 170
See application file for complete search history.

(56) References Cited

U.S. PATENT DOCUMENTS

| | | | | |
|---|---|---|---|---|
| 5,623,604 | A * | 4/1997 | Russell et al. | 717/167 |
| 5,649,112 | A * | 7/1997 | Yeager et al. | 709/220 |
| 6,009,274 | A * | 12/1999 | Fletcher et al. | 717/173 |
| 6,189,050 | B1 | 2/2001 | Sakarda | |
| 6,189,145 | B1 * | 2/2001 | Bellin et al. | 717/170 |
| 6,237,091 | B1 * | 5/2001 | Firooz et al. | 713/1 |
| 6,629,315 | B1 * | 9/2003 | Naylor | 717/168 |
| 6,708,231 | B1 * | 3/2004 | Kitagawa | 710/10 |
| 6,834,384 | B2 | 12/2004 | Fiorella, III et al. | |
| 6,944,854 | B2 | 9/2005 | Kehne et al. | |
| 6,973,587 | B1 * | 12/2005 | Maity et al. | 714/6 |
| 7,010,584 | B1 | 3/2006 | Craft | |
| 7,130,997 | B2 * | 10/2006 | Hsu et al. | 713/2 |
| 7,185,331 | B2 * | 2/2007 | Talati et al. | 717/168 |
| 7,197,634 | B2 * | 3/2007 | Kruger et al. | 713/1 |
| 7,219,343 | B2 * | 5/2007 | Almeida et al. | 717/172 |
| 7,222,339 | B2 * | 5/2007 | Rothman et al. | 717/168 |
| 7,305,668 | B2 * | 12/2007 | Kennedy et al. | 717/168 |
| 7,458,073 | B1 * | 11/2008 | Darling et al. | 717/168 |
| 7,546,596 | B2 * | 6/2009 | Needham | 717/169 |
| 2002/0092008 | A1 * | 7/2002 | Kehne et al. | 717/168 |
| 2002/0152305 | A1 * | 10/2002 | Jackson et al. | 709/224 |
| 2004/0010786 | A1 * | 1/2004 | Cool et al. | 717/170 |
| 2004/0031030 | A1 * | 2/2004 | Kidder et al. | 717/172 |
| 2004/0205776 | A1 * | 10/2004 | Harrington et al. | 719/320 |
| 2005/0216721 | A1 * | 9/2005 | Zimmer et al. | 713/2 |
| 2005/0216904 | A1 * | 9/2005 | Needham | 717/168 |
| 2006/0107071 | A1 | 5/2006 | Girish et al. | |
| 2006/0271204 | A1 * | 11/2006 | Hesse et al. | 700/2 |

* cited by examiner

*Primary Examiner*—Robert Beausoliel
*Assistant Examiner*—Elmira Mehrmanesh
(74) *Attorney, Agent, or Firm*—Dillon & Yudell LLP (57) ABSTRACT

A system, method, and computer-usable medium for applying a destructive firmware update in a non-destructive manner. According to a preferred embodiment of the present invention, during operation of a multiprocessor data processing system, a service processor updates firmware in the multiprocessor data processing system from a first firmware setting to a second firmware setting. The service processor iteratively applies the second firmware setting to hardware within the multiprocessor data processing system by de-allocating a first hardware device when the second firmware setting includes at least one destructive operation targeted to the first hardware device, performing the destructive operation on the first hardware device, and re-allocating the first hardware device into the multiprocessor data processing system when the destructive operation is complete.

14 Claims, 10 Drawing Sheets

SYSTEM AND METHOD FOR APPLYING A DESTRUCTIVE FIRMWARE UPDATE IN A NON-DESTRUCTIVE MANNER

BACKGROUND OF THE INVENTION

1. Technical Field

The present invention relates in general to the field of data processing systems, and in particular, to the field of updating data processing systems. Still more particularly, the present invention relates to a system and method for applying a destructive firmware update.

2. Description of the Related Art

Currently, many data processing systems that are utilized as web servers are multiprocessor data processing systems (MPs). These MPs include "service processors" that are utilized to perform many tasks that affect the MP as a whole, such as, for example, monitoring the temperature of the MP so that an exhaust fan may be turned on and off at appropriate times. The service processor may also monitor other resources within the MP shared by the many different host operating systems that may be executing on the system.

During a system boot process, an ordered, software-controlled transition of states occurs within the MP hardware. During each state, MP hardware may execute initialization procedures indicated in firmware to reach a desired configuration at the end of the boot process. As is well-known in the art, there is occasionally a need to make firmware updates to the service processor to obtain new MP configurations, as discussed below in conjunction with FIG. 1. These firmware updates may happen frequently and affect MP productivity in the event the firmware update includes "destructive operations". Destructive operations are operations that, when executed on MP hardware, cause that hardware to be taken offline (rebooted). If the update does not include destructive operations, the update can be applied and act on the hardware in a running system immediately. If the update includes destructive operations, the MP must be rebooted to execute the firmware update.

Figure 1:
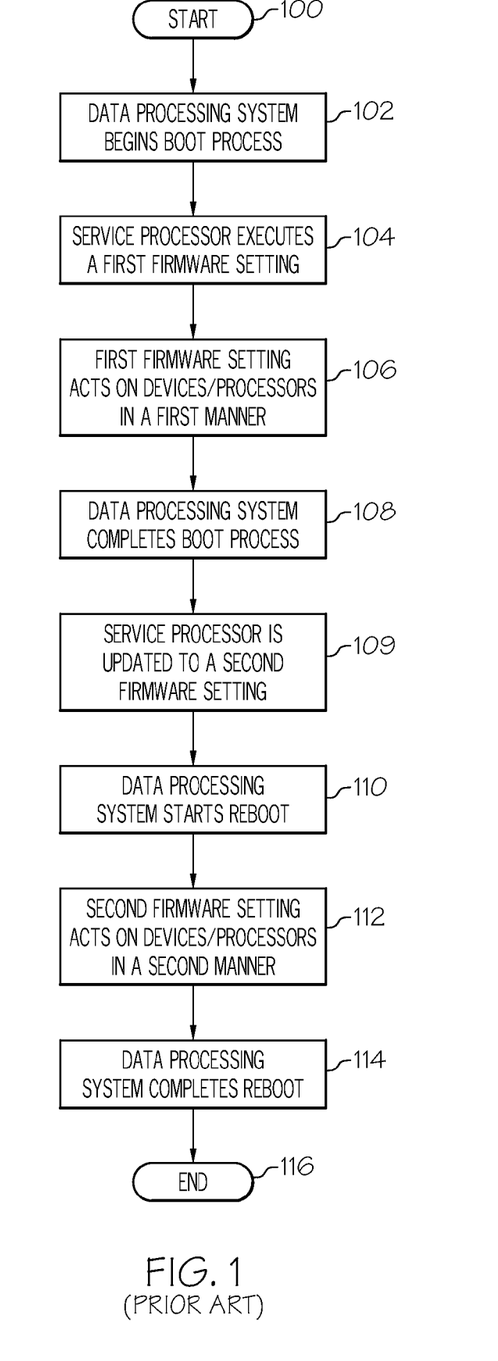
FIG. 1 is a high-level logical flowchart illustrating processing of a firmware update in a multiprocessor data processing system (MP) according to the prior art.

Referring to FIG. 1, there is illustrated a high-level logical flowchart depicting a firmware update on a MP according to the prior art. The process begins at step 100 and continues to step 102, which illustrates a MP beginning a boot process. The process proceeds to step 104, which depicts a service processor in the MP executing a first firmware setting. The firmware setting acts on the hardware within the MP in a first manner, as shown in step 106. For example, the first firmware setting may set a first set of temperature thresholds to determine when to activate and deactivate an exhaust fan. The process continues to step 108, which illustrates the MP completing the boot process. Shown in step 109, the service processor within the MP is updated to a second firmware setting, which acts on the MP hardware in a second, different manner. The process continues to step 110, which illustrates the MP rebooting after the firmware update. The process proceeds to step 112, which depicts the second firmware setting acting on the MP hardware in a second manner following reboot. For example, the second firmware setting may set a second set of temperature thresholds to determine when to activate and deactivate an exhaust fan. The MP completes the reboot, as shown in step 114, and the process ends, as illustrated in step 116.

Rebooting an entire MP to complete a firmware update is a costly endeavor, both in time lost and reduced productivity. Therefore, there is a need for a system and method for applying a destructive firmware update in a non-destructive manner to address the limitations of the prior art.

SUMMARY OF THE INVENTION

The present invention includes a system, method, and computer-usable medium for applying a destructive firmware update in a non-destructive manner. According to a preferred embodiment of the present invention, during operation of a multiprocessor data processing system, a service processor updates firmware in the multiprocessor data processing system from a first firmware setting to a second firmware setting. The service processor iteratively applies the second firmware setting to hardware within the multiprocessor data processing system by de-allocating a first hardware device when the second firmware setting includes at least one destructive operation targeted to the first hardware device, performing the destructive operation on the first hardware device, and re-allocating the first hardware device into the multiprocessor data processing system when the destructive operation is complete.

The above, as well as additional purposes, features, and advantages of the present invention, will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN ILLUSTRATIVE EMBODIMENT

As discussed in more detail herein, the present invention includes a system and method for applying a destructive firmware update in a non-destructive manner. When a multi-processor data processing system (MP) updates a first set of firmware to a second set of firmware, a service processor iteratively applies the second set of firmware to hardware within the MP. The service processor determines if the second set of firmware includes at least one destructive operation. If the second set of firmware includes at least one destructive operation targeted to a first hardware device, the service processor de-allocates the first hardware device via a hot-removal procedure. The service processor performs the destructive operation on the first hardware device and when the destructive operation is completed, the service processor re-allocates the first hardware device into the MP via a hot-plug procedure.

Figure 2:
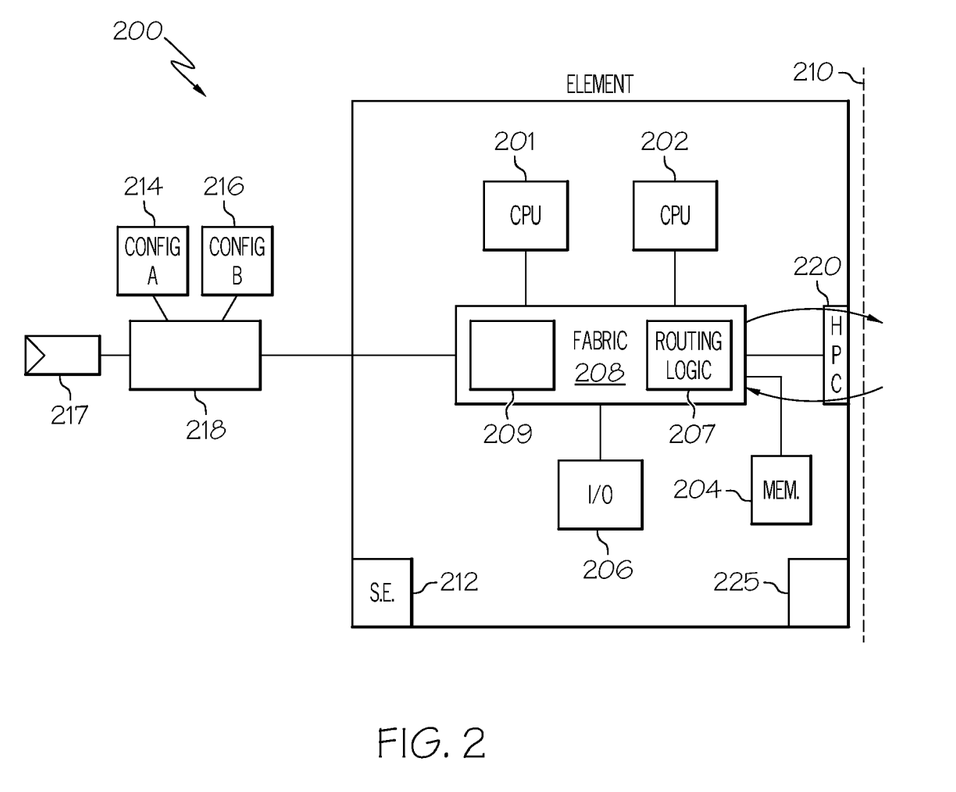
FIG. 2 is a block diagram of a MP (server) designed with fabric control logic utilized to provide various hot-plug features according to one embodiment of the present invention.

Turning now to the figures and in particular to FIG. 2, there is a MP designed with fabric 208 and other components that enable the implementation of the hot removal features of the invention. MP 200 includes processor 201 and processor 202. MP 200 also includes memory 204 and input/output (I/O) controller/device 206. The various components are interconnected via interconnect fabric 208, which includes hot-plug/hot-removal connector 220. Addition of new hot-plug/hot-removal hardware components is completed (directly or indirectly) via hot-plug/hot-removal connector 220 of interconnect fabric 208, as will be described in further detail below.

Interconnect fabric 208 includes wires and control logic for routing communication between the components as well as controlling the response of MP 200 to changes in the hardware configuration. Control logic includes routing logic 207 and configuration setting logic 209. Specifically, as illustrated in the insert to the left of MP 200, configuration setting logic 209 includes a first and second configuration setting, configA 214 and configB 216. ConfigA 214 and configB 216 are coupled to a mode setting register 218, which is controlled by latch 217. Actual operation of components within configuration setting logic 209 will be described in greater detail below.

In addition to the above components, MP 200 also comprises service element (SE) 212. SE 212 is a small microcontroller comprising special software-coded logic (separate from the operating system (OS)) that is utilized to maintain components of a MP and complete interface operations for large-scale systems. SE 212 thus runs code required to control MP 200. SE 212 notifies the OS of additional processor resources within the MP (i.e., increase/decrease in number of processors) as well as addition/removal of other MP resources (i.e., memory and I/O, etc.).

Figure 3A:
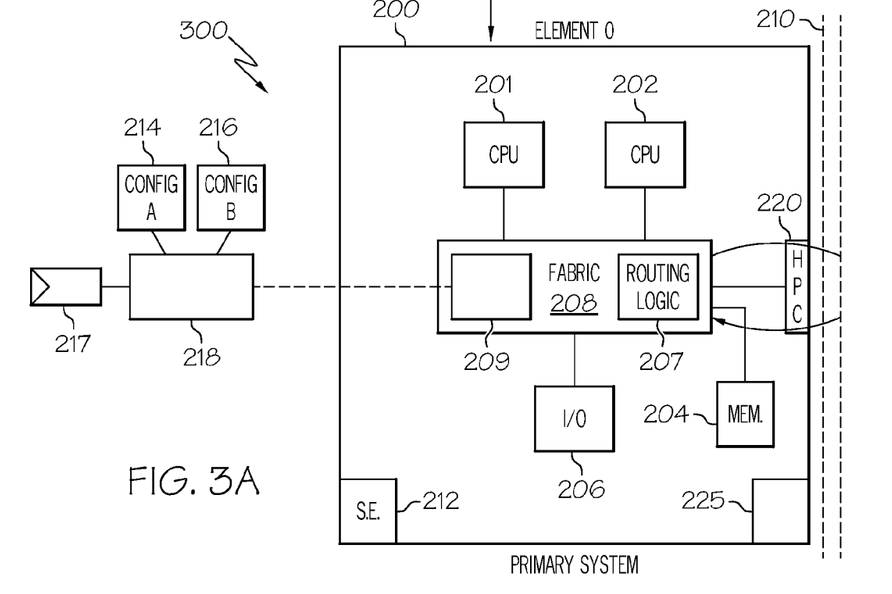
FIG. 3 is a block diagram of a MP that includes two servers of FIG. 2 configured for hot-plugging in accordance with one embodiment of the present invention.
Figure 3B:
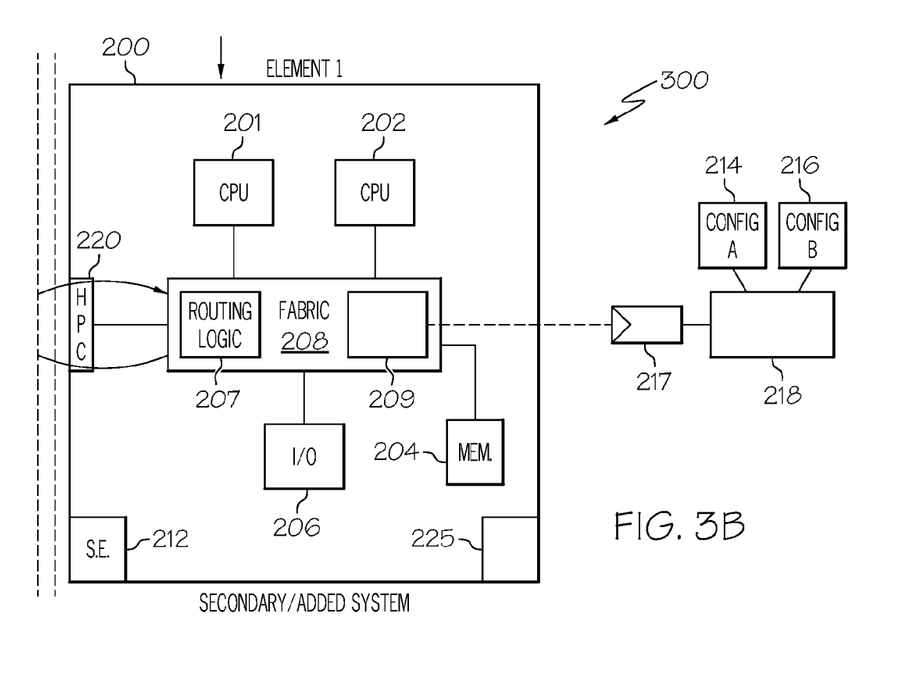

FIG. 3 illustrates two MPs similar to that of MP 200 of FIG. 2 that are being coupled together via respective hot-plug/hot-removal connectors 220 to create a larger symmetric MP) (SMP) system. MPs 200 are labeled element0 and element1 and are labeled as such for descriptive purposes. Element1 may be coupled to Element0 via a wire, connector pin, or cable connection that is designed for coupling hot-plug/hot-removal connectors 220 of separate MPs 200. In one embodiment of the present invention, each MP may literally be plugged into a background processor expansion rack that enables expansion of the customer's SMP to accommodate additional MPs.

By example, Element0 is the primary MP (or server) of a customer who is desirous of increasing the processing capabilities/resources of his primary MP. Element1 is a secondary MP being added to the primary MP by a system technician. According to a preferred embodiment of the present invention, the addition of Element1 occurs via the hot-plug operation provided herein and the customer never experiences downtime of Element0 while Element1 is being connected. After Element0 and Element1 are combined to increase the processing capabilities/resources of a MP, a system technician may want to separate Element0 from Element1 for maintenance or other purposes. The separation may be accomplished via a hot-removal procedure, which also ensures that a customer encounters minimal or no downtime during the separation.

As illustrated within FIG. 3, SMP 300 comprises a physical partition 210, indicated by dotted lines, separating Element0 and Element1. The physical partition 210 enables each MP 200 to operate somewhat independently of the other, and in some implementations, physical partition 210 substantially shields each MP 200 from operating problems and downtime of the other MP 200.

Figure 4:
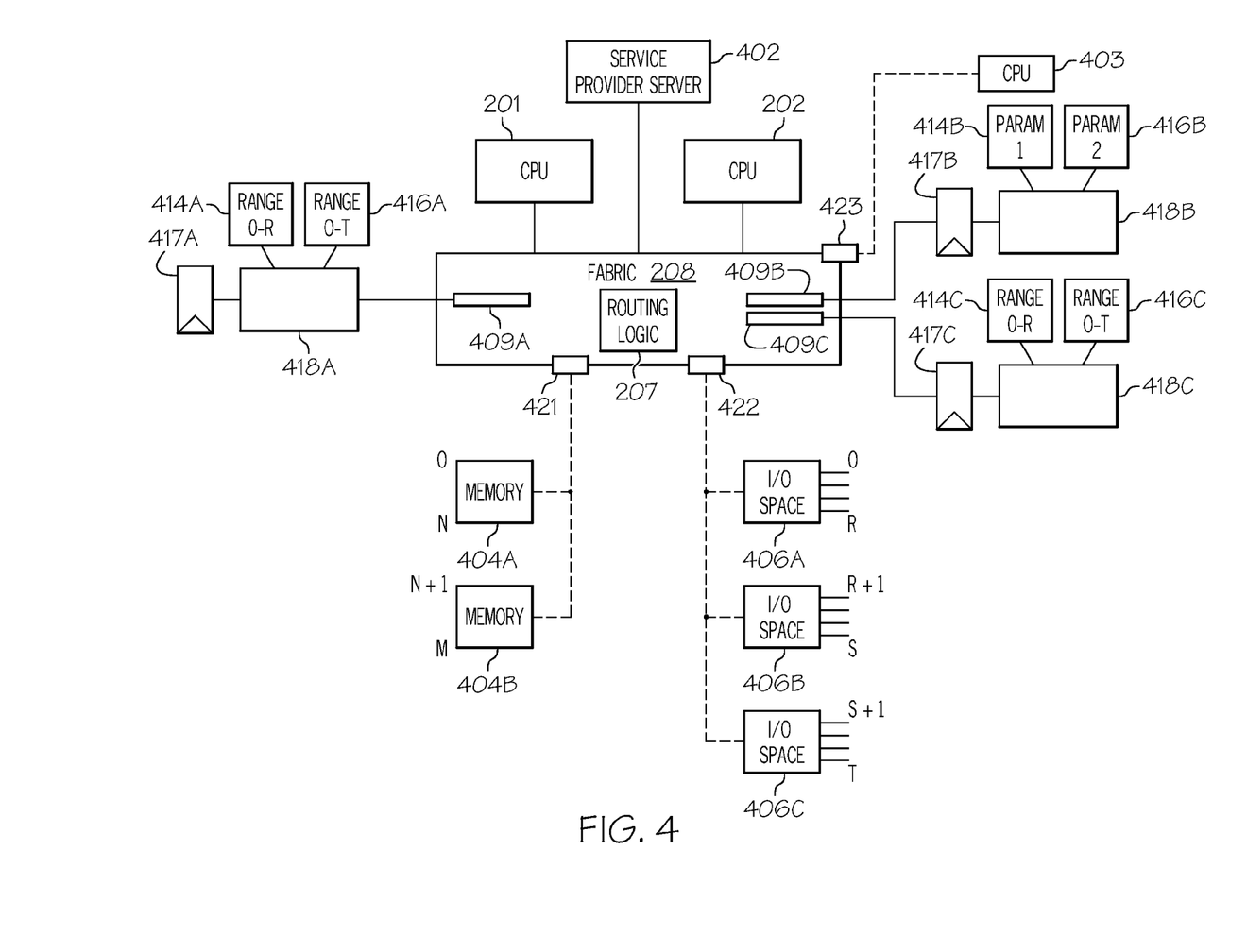
FIG. 4 is a block diagram of a MP that enables hot-plug expansion of all major components according to one embodiment of the present invention.

One additional extension of the hot-plug/hot-removal functionality is illustrated by FIG. 4. Specifically, FIG. 4 extends the features of the above non-disruptive, hot-plug/hot-removal functionality to cover hot-plug addition of additional memory and I/O channels as well as heterogeneous processors. MP 400 includes similar primary components as MP 200 of FIG. 2, with new components identified by reference numerals in the 400s. In addition to the primary components (i.e., process 201 and processor 202, memory 404A, and I/O channel 406A coupled together via interconnect fabric 208), MP 400 includes several additional connector ports on fabric 208. These connector ports include hot-plug/hot-removal memory expansion port 421, hot-plug/hot-removal expansion port 422, and hot-plug/hot-removal processor expansion port 423.

Each expansion port has corresponding configuration logic 409A, 409B, and 409C to control hot-plug operations for their respective components. In addition to memory 404A, additional memory 404B may be "plugged" into memory expansion port 421 of fabric 208 similarly to the process described with respect to MP 300 and Element0 and Element1. The initial memory range of addresses 0 to N is expanded now to include addresses N+1 to M. Configuration modes for either size memory are selectable via latch 417A, which is set by SE 212 when additional memory 404B is added. Also, additional I/O channels may be provided by hot-plugging I/O channels 406B, 406C into hot-plug/hot-removal I/O expansion port 422. Again, configuration modes for the size of I/O channels are selectable via latch 417C, set by SE 212 when additional I/O channels 406B, 406C are added and/or removed. Also, MP 400 is coupled to service provider server 402, discussed herein in more detail in conjunction with FIGS. 7-8.

The above configuration enables the MP to shrink/grow processors, memory, and/or I/O channels accordingly with minimal processing delays on MP 400. Specifically, the above configuration enables the growing (and shrinking) of available address space for both memory and I/O. Each add-on or removal is handled independently of the others, i.e., processor vs. memory or I/O, and is controlled by separate logic, as shown. Accordingly, the invention extends the concept of "hot-plug/hot-removal" to devices that are traditionally not capable of being hot-plugged/hot-removed in the traditional sense of the term.

To remove hot-plugged components (e.g., element1) in MP 200, a technician, user, or automated process (e.g., a SE 212 firmware upgrade) selects a removal option within a software configuration utility running on the MP. SE 212 notifies the operating system of processing loss of Element1 resources. In response, the operating system re-allocates the tasks/workload from Element1 to Element0 and vacates Element1. SE 212 monitors the operation system for an indication that the operating system has completed the re-allocation of all processing (and data storage) from Element1 to Element0, and a determination is made whether that re-allocation is completed. Once the re-allocation is completed, the operating system messages SE 212, and SE 212 loads an alternate configuration setting into configuration register 218. The loading of the alternate configuration setting is completed by SE 212 setting the value within latch 217 for selection of that configuration setting. Element1 is logically de-allocated (hot-removed) from MP 200. To re-allocate (hot-plug) Element1 into MP 200, SE 212 notifies the operation system of the introduction of Element1 and the operating system re-allocates and rebalances the tasks/workload among all of the connected elements. SE 212 loads the original configuration setting into configuration register 218.

As previously discussed, firmware stored within SE 212 may be periodically updated to alter the way SE 212 interacts with components within MP 400 at MP boot or startup. These firmware updates may happen frequently and affect MP productivity in the event that the firmware update includes "destructive operations". Destructive operations are operations that, when executed on data processing system hardware, cause that hardware to be taken offline. If the update does not include destructive operations, the update can be applied and act on the hardware in a running MP immediately. As discussed in conjunction with FIG. 1, the prior art requires that the entire MP be rebooted if the update includes destructive operations.

Figure 5:
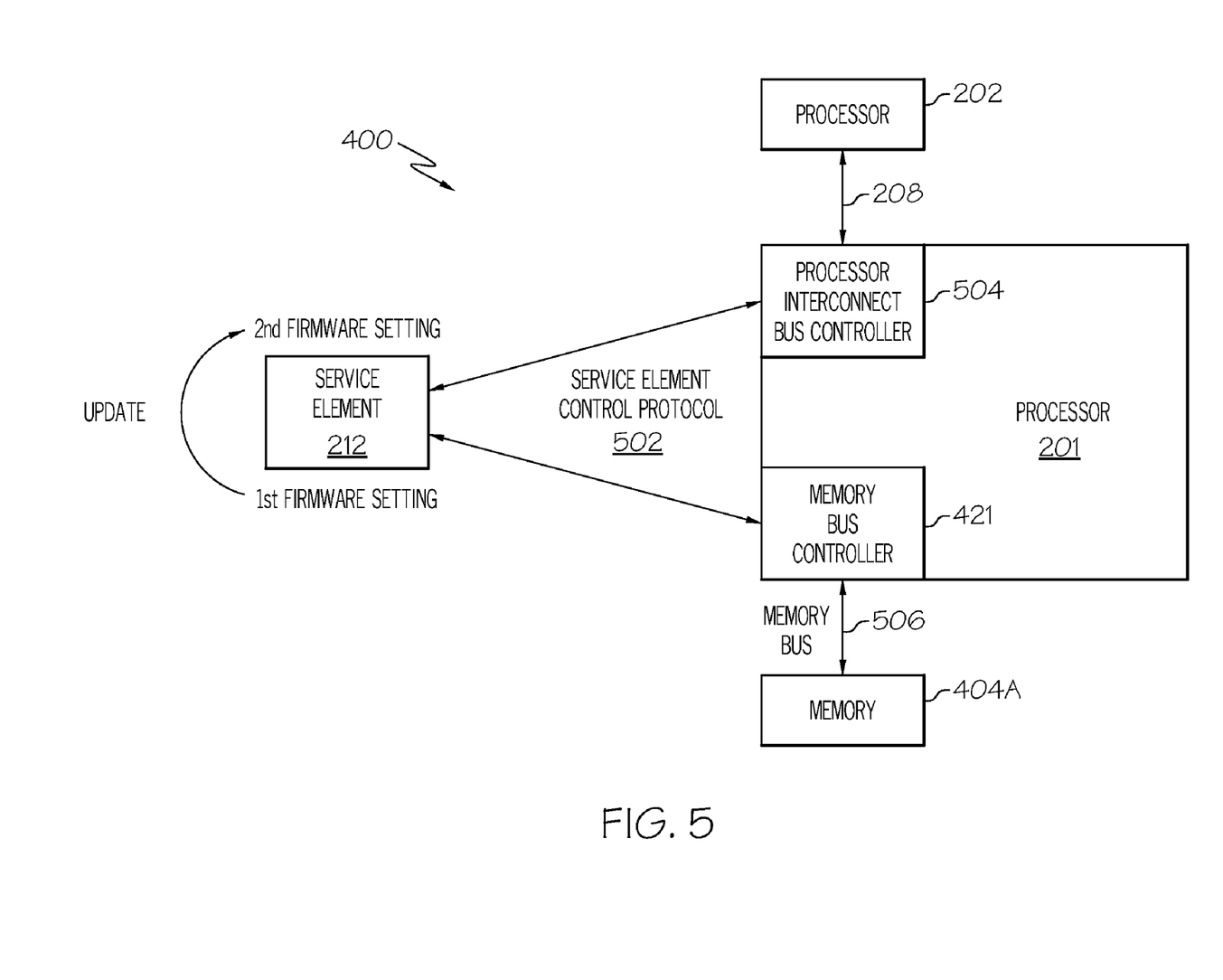
FIG. 5 is a block diagram illustrating a relationship between a service element and a collection of processors in an MP according to a preferred embodiment of the present invention.

According to a preferred embodiment of the present invention, in the event that a firmware update includes at least one destructive operation, those operations may be applied to components within MP 400 in a non-destructive manner. FIG. 5 is a block diagram illustrating the relationship between the service element and the processors within each MP 400 according to a preferred embodiment of the present invention.

Generally, service element (SE) 212 communicates with each processor 201 and 202 in MP 400 via service element control protocol 502. Processors 201 and 202 communicate with each other via interconnect fabric 208, utilizing processor interconnect bus controller 504. Processor 201 also communicates with memory 404A via memory bus 506.

In accordance with the present invention, the service element operating system and the applications running on SE 212 are the firmware that is being updated, as illustrated by the first and second firmware settings. According to a preferred embodiment of the present invention, if while the operating system is running on MP 400, the firmware stored on SE 212 is updated and the new firmware includes at least one destructive operation, the destructive operation may be applied without rebooting MP 400. For example, if a destructive operation targets processor 201, service element 212 will de-allocate processor 201 via the previously-described hot-removal process by re-allocating the workload to processor 202, loading an alternate configuration setting into a configuration register, such as configuration register 218, and de-allocating (e.g., hot-removing) processor 201. Service element 212 will ensure that processor 202 remains running to handle the re-allocated workload. Once the destructive operation is complete, service element 212 will re-allocate processor 201 via the previously-described hot-plug procedure. Service element 212 iteratively applies the destructive operations to all targeted devices/processors in MP 400. If there is a destructive operation targeted for processor 202, service element 212 will re-allocate the workload to processor 201, hot-remove processor 202, perform the destructive operation targeted to processor 202, and re-allocate (e.g., hot-plug) processor 202 into MP 400, while processor 201 processes the re-allocated tasks during the destructive operation.

Figure 6:
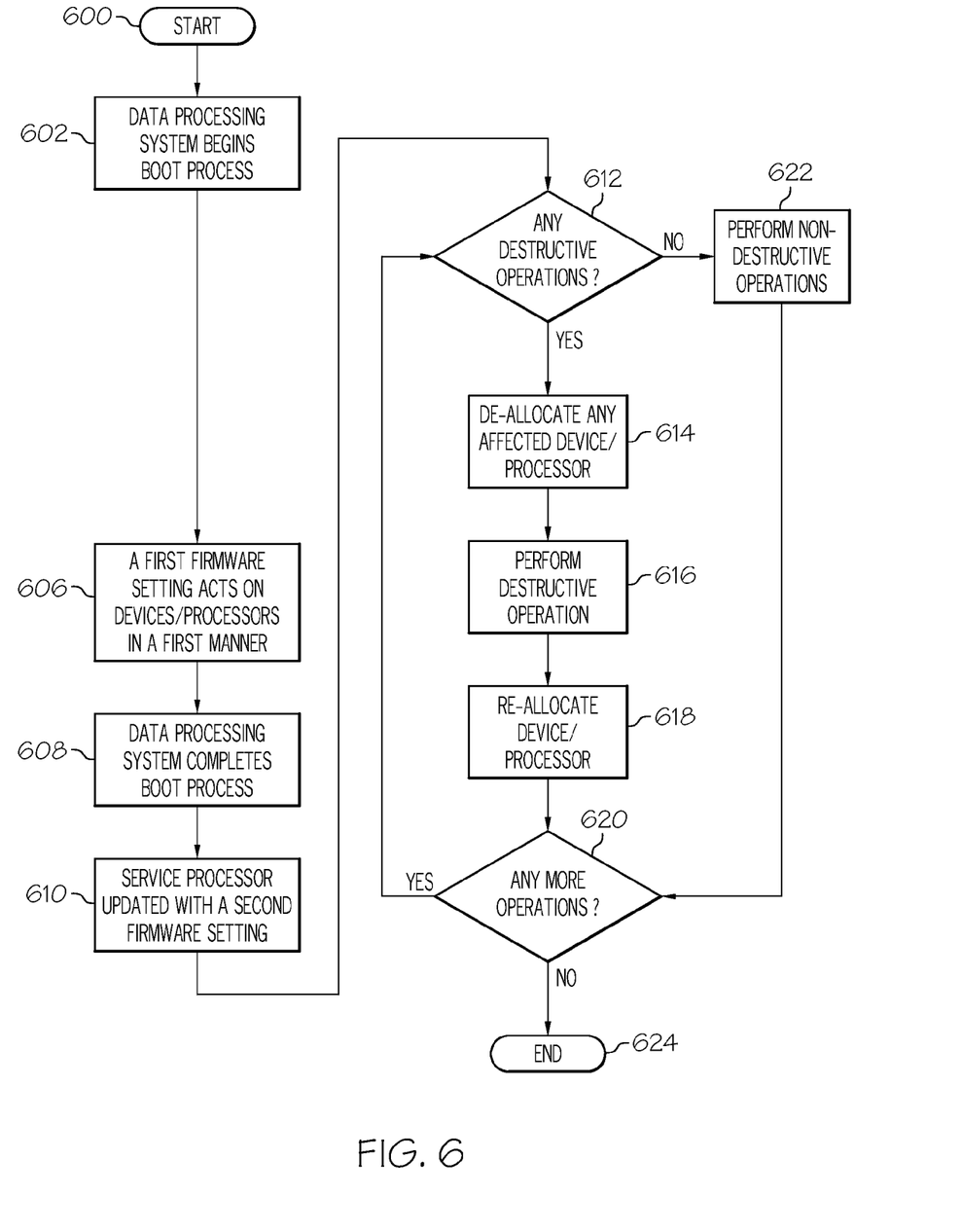
FIG. 6 is a high-level logical flowchart illustrating an exemplary method for the application of a destructive firmware update to the MP in a nondestructive manner according to a preferred embodiment of the present invention.

FIG. 6 is a high-level logical flowchart illustrating an exemplary method for implementing destructive firmware updates in a non-destructive manner according to a preferred embodiment of the present invention. Preferably, this method is applied iteratively to the entire MP (e.g., MP 200 or MP 400) so that at least one processor remains active at all times. The process begins at step 600 and proceeds to step 602, which illustrates MP 400 beginning a MP boot process. SE 212, within MP 400, includes a first firmware setting, which acts on the devices/processors within MP 400 in a first manner, as shown in step 606. The process continues to step 608, which illustrates MP 400 completing the boot process. The process proceeds to step 610, which depicts SE 212 within MP 400 updating the first firmware setting to a second firmware setting. The process continues to step 612, which illustrate SE 212 determining if the update to the second firmware setting includes any destructive operations. As previously discussed, when a destructive operation is applied to devices/processors within MP 400, those devices/processors must be taken offline. If there are no destructive operations in the update to the second firmware setting, the process continues to step 622, which illustrates SE 212 performing the non-destructive operations on the affected devices/processors within MP 400. The process then proceeds to step 620.

If, however, SE 212 determines that there are destructive operations in the update to the second firmware setting, the process continues to step 614, which depicts SE 212 de-allocating any device/processor that is affected by the destructive operations via the "hot-removal" procedure discussed in conjunction with FIGS. 2-4.

Once the affected devices/processors are de-allocated from MP 400, SE 212 will re-boot the devices/processors and perform the destructive operation on those devices/processors, as shown in step 616. The process continues to step 618, which illustrates SE 212 re-allocating the affected devices/processors according to the "hot-plug" method detail in conjunction with FIGS. 2-4.

The process proceeds to step 620, which illustrates SE 212 determining if there are any more operations to be applied within the firmware update to firmware B. If there are remaining operations to be performed, the process returns to step 612 and continues in an iterative fashion. If there are no more operations to be performed, the process proceeds to step 622, which depicts the process ending. According to a preferred embodiment of the present invention, at least one processor remains active while de-allocation of a device/processor targeted by a destructive operation occurs. The processors that remain active during prior de-allocations of devices/processors targeted by destructive operations may be later de-allocated to apply the firmware upgrade.

Also, a preferred embodiment of the present invention considers the scope of the de-allocations during the application of destructive operations. For example, the specifics of the destructive operation and the platform configuration may require more than one processor to be de-allocated. In another embodiment of the present invention, SE 212 de-allocates as few processors as possible. This minimizes the performance impact to the rest of the MP when the destructive operation is executed on the de-allocated processors. As previously discussed, the processors that remain active during prior de-allocations of devices/processors targeted by destructive operations may be later de-allocated to apply the firmware upgrade. If the destructive operation is targeted for an application specific integrated circuit (ASIC) (e.g., memory controllers, L3 chips, dynamic random access memory (DRAM), etc.) instead of a processor, SE 212 will also de-allocate the processor associated with the ASIC. As previously discussed, the de-allocation, operation, and re-allocation procedure is repeated until the firmware update has been applied to all of the necessary hardware in the entire MP.

As discussed, the present invention includes a system, method, and computer-usable medium for applying a destructive firmware update in a non-destructive manner. According to a preferred embodiment of the present invention, during operation of a multiprocessor data processing system, a service processor updates firmware in the multiprocessor data processing system from a first firmware setting to a second firmware setting. The service processor iteratively applies the second firmware setting to hardware within the multiprocessor data processing system by de-allocating a first hardware device when the second firmware setting includes at least one destructive operation targeted to the first hardware device, performing the destructive operation on the first hardware device, and re-allocating the first hardware device into the multiprocessor data processing system when the destructive operation is complete.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), and system memory such as, but not limited to Random Access Memory (RAM). It should be understood, therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention are performed by service provider server 402. Alternatively, the method described herein and in particular as shown and described in FIG. 6, can be deployed as a process software from service provider server 402 to a client computer (e.g., MPs 200 or 400). Still more particularly, process software for the method so described may be deployed to service provider server 402 by another service provider server (not shown).

Figure 7A:
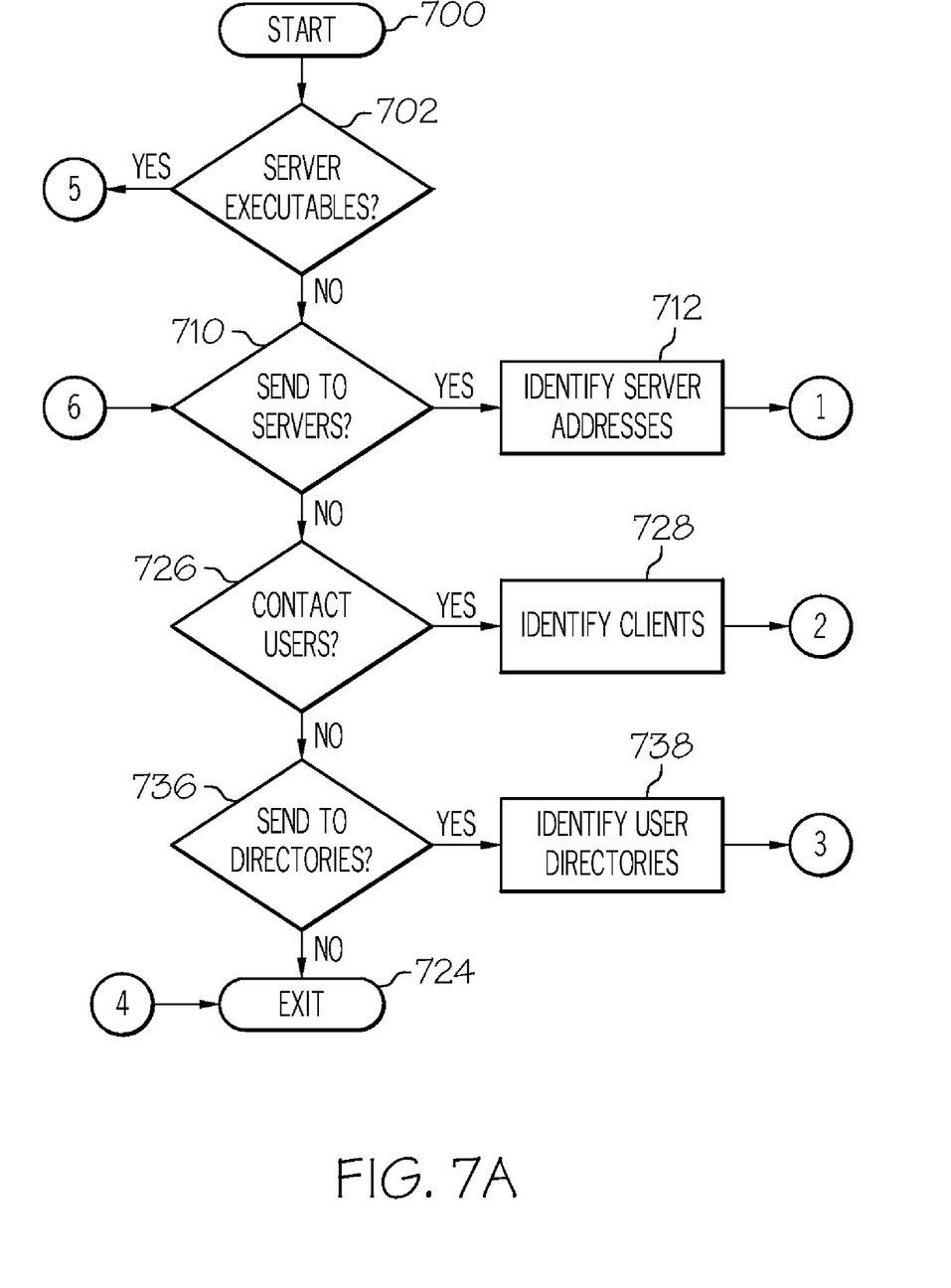
FIGS. 7a-b show a flowchart of steps taken to deploy software capable of executing the steps shown and described in FIG. 6.
Figure 7B:
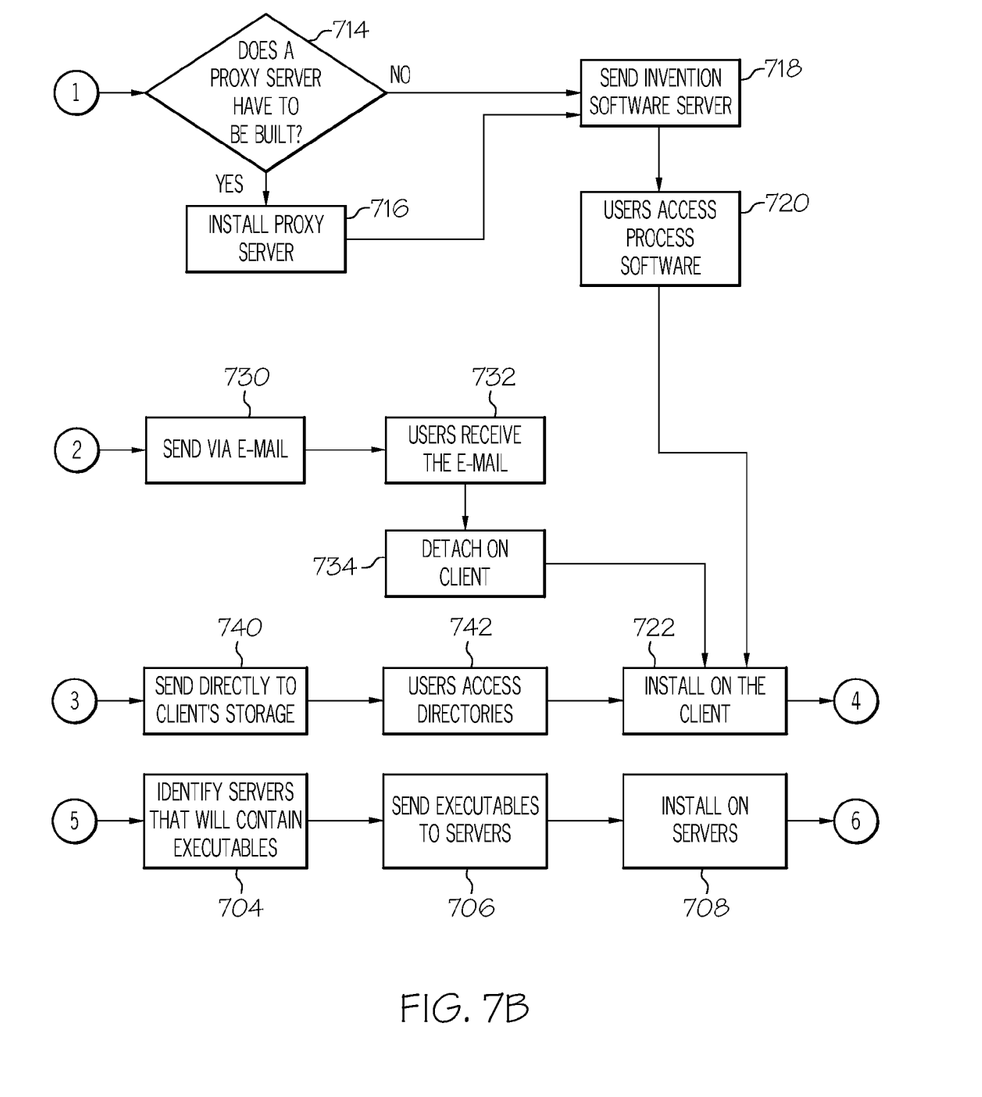

Referring then to FIGS. 7*a-b*, step 700 begins the deployment of the process software. The first thing is to determine if there are any programs that will reside on a server or servers when the process software is executed (query block 702). If this is the case, then the servers that will contain the executables are identified (block 704). The process software for the server or servers is transferred directly to the servers' storage via File Transfer Protocol (FTP) or some other protocol or by copying though the use of a shared file system (block 706). The process software is then installed on the servers (block 708).

Next, a determination is made on whether the process software is to be deployed by having users access the process software on a server or servers (query block 710). If the users are to access the process software on servers, then the server addresses that will store the process software are identified (block 712).

A determination is made if a proxy server is to be built (query block 714) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 716). The process software is sent to the servers either via a protocol such as FTP or it is copied directly from the source files to the server files via file sharing (block 718). Another embodiment would be to send a transaction to the servers that contained the process software and have the server process the transaction, then receive and copy the process software to the server's file system. Once the process software is stored at the servers, the users via their client computer, then access the process software on the servers and copy to their client computers file systems (block 720). Another embodiment is to have the servers automatically copy the process software to each client and then run the installation program for the process software at each client computer. The user executes the program that installs the process software on his client computer (block 722) and then exits the process (terminator block 724).

In query step 726, a determination is made as to whether the process software is to be deployed by sending the process software to users via e-mail. The set of users where the process software will be deployed are identified together with the addresses of the user client computers (block 728). The process software is sent via e-mail to each of the users' client computers (block 730). The users then receive the e-mail (block 732) and detach the process software from the e-mail to a directory on their client computers (block 734). The user executes the program that installs the process software on his client computer (block 722) and then exits the process (terminator block 724).

Lastly, a determination is made as to whether the process software will be sent directly to user directories on their client computers (query block 736). If so, the user directories are identified (block 738). The process software is transferred directly to the user's client computer directory (block 740). This can be done in several ways such as but not limited to sharing of the file system directories and then copying from the sender's file system to the recipient user's file system or alternatively using a transfer protocol such as File Transfer Protocol (FTP). The user accesses the directories on his client file systems in preparation for installing the process software (block 742). The user executes the program that installs the process software on his client computer (block 722) and then exits the process (terminator block 724).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs, the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that is required by the process software or that works in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure that the parameter lists match the parameter lists required by the process software. Conversely, parameters passed by the software applications to the process software will be checked to ensure that the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents but one measurement of use. Other measurements of use include but are not limited to network bandwidth, memory utilization, storage utilization, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory utilization, storage utilization, etc., approach a capacity so as to affect performance, additional network bandwidth, memory utilization, storage, etc., are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
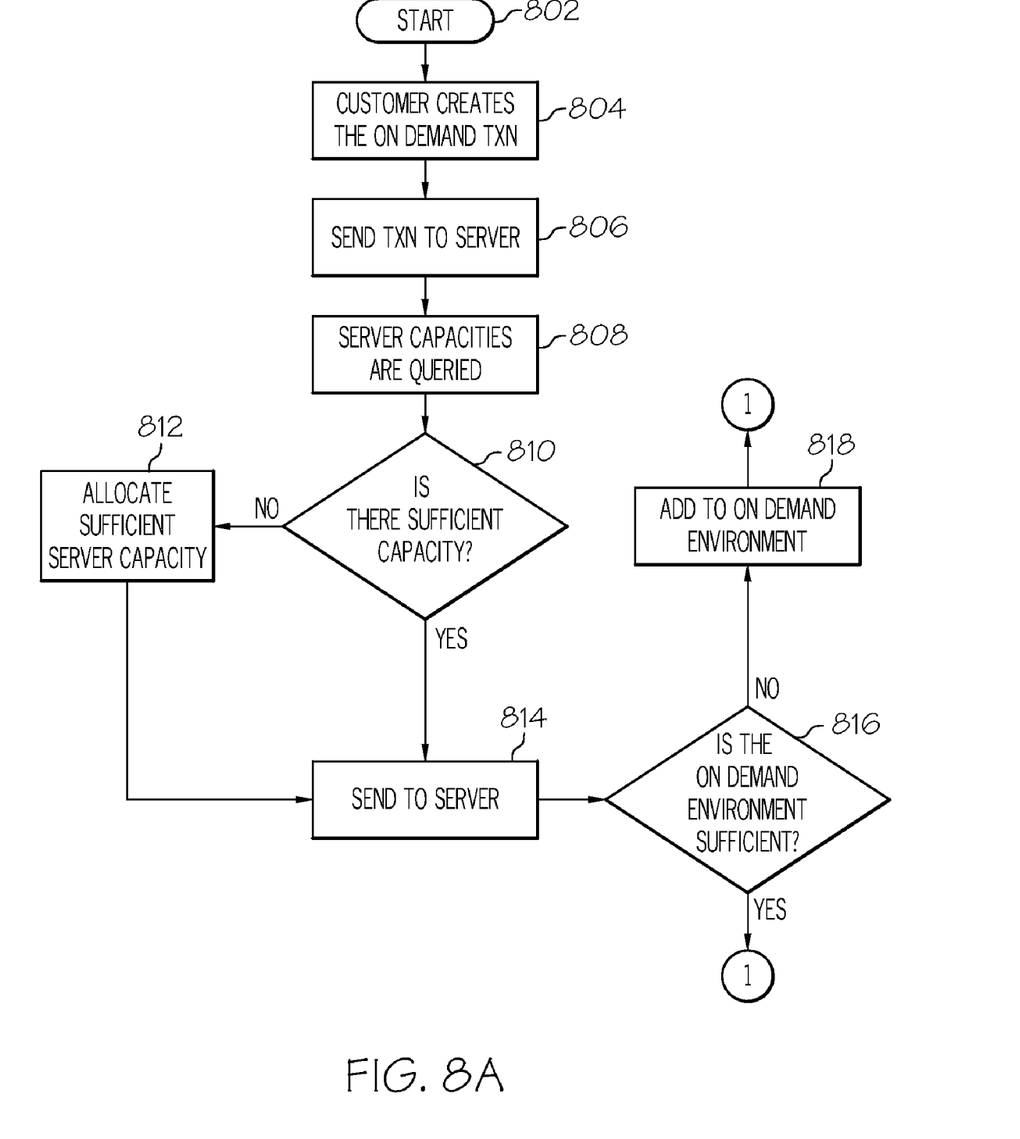
FIGS. 8a-b show a flowchart showing steps taken to execute the steps shown and described in FIG. 6 using an on-demand service provider.
Figure 8B:
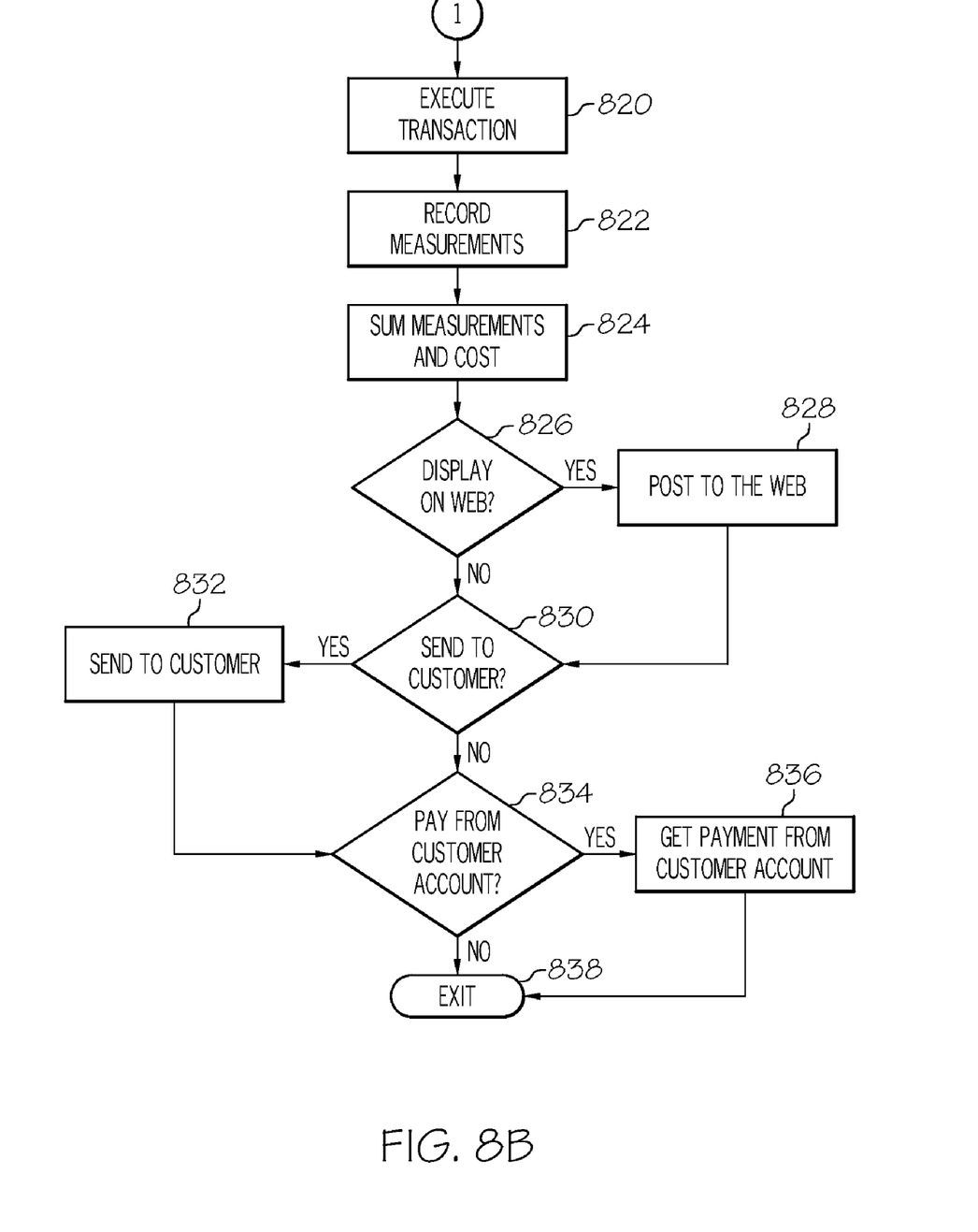

With reference now to FIGS. 8a-b, initiator block 802 begins the On Demand process. A transaction is created than contains the unique customer identification, the requested service type and any service parameters that further specify the type of service (block 804). The transaction is then sent to the main server (block 806). In an On Demand environment, the main server can initially be the only server, then as capacity is consumed other servers are added to the On Demand environment.

The server central processing unit (CPU) capacities in the On Demand environment are queried (block 808). The CPU requirement of the transaction is estimated, then the servers' available CPU capacity in the On Demand environment are compared to the transaction CPU requirement to see if there is sufficient CPU capacity available in any server to process the transaction (query block 810). If there is not sufficient server CPU capacity available, then additional server CPU capacity is allocated to process the transaction (block 812). If there was already sufficient available CPU capacity, then the transaction is sent to a selected server (block 814).

Before executing the transaction, a check is made of the remaining On Demand environment to determine if the environment has sufficient available capacity for processing the transaction. This environment capacity consists of such things as, but is not limited to, network bandwidth, processor memory, storage, etc. (block 816). If there is not sufficient available capacity, then capacity will be added to the On Demand environment (block 818). Next, the required software to process the transaction is accessed, loaded into memory, and then the transaction is executed (block 820).

The usage measurements are recorded (block 822). The utilization measurements consist of the portions of those functions in the On Demand environment that are used to process the transaction. The usage of such functions as, but not limited to, network bandwidth, processor memory, storage and CPU cycles, are what is recorded. The usage measurements are summed, multiplied by unit costs and then recorded as a charge to the requesting customer (block 824). If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, mainframe computers, routers, switches, personal digital assistants (PDAs), telephones, and any other system capable of processing, transmitting, receiving, capturing and/or storing data.

What is claimed is:

1. A method for implementing a firmware update in a multiprocessor data processing system, said method comprising:
   updating firmware in said multiprocessor data processing system from a first firmware setting to a second firmware setting; and
   iteratively applying said second firmware setting to hardware within said multiprocessor data processing system by:
      when said second firmware setting includes at least one destructive operation targeted to a first hardware device within said multiprocessor data processing system,
         de-allocating workload from said first hardware device and re-allocating said workload to a second hardware device within said multiprocessor data processing system;
         performing said destructive operation on said first hardware device;
         rebooting said first hardware device; and,
         when said rebooting said first hardware device is complete, de-allocating said workload from said second hardware device and re-allocating said workload to said first hardware device; and
      when said second firmware setting does not include at least one destructive operation,
         applying said second firmware setting to said first hardware device without said de-allocating said workload from and said re-allocating said workload to said first hardware device.

2. The method according to claim 1, further comprising:
   initiating a boot process in said multiprocessor data processing system.

3. The method according to claim 1, wherein said de-allocating said workload from said first hardware device further comprises:
   de-allocating said first hardware device via a hot-removal procedure.

4. The method according to claim 1, wherein said re-allocating said workload to said first hardware device further comprises:
   re-allocating said first hardware device via a hot-plug procedure.

5. A system for implementing a firmware update in a multiprocessor data processing system, said system comprising:
   a plurality of processors;
   a data bus coupled to said plurality of processors;
   a computer-readable storage medium embodying computer program code, said computer-readable storage medium being coupled to said data bus, said computer program code comprising instructions executable by said plurality of processors and configured for:
      updating firmware in said multiprocessor data processing system from a first firmware setting to a second firmware setting; and
      iteratively applying said second firmware setting to hardware within said multiprocessor data processing system by:
         when said second firmware setting includes at least one destructive operation targeted to a first hardware device within said multiprocessor data processing system,
            de-allocating workload said first hardware device;
            re-allocating said workload to a second hardware device within said multiprocessor data processing system;
            performing said destructive operation on said first hardware device;
            rebooting said first hardware device; and,
            when said rebooting said first hardware device is complete, de-allocating said workload from said second hardware device and re-allocating said workload to said first hardware device; and
         when said second firmware setting does not include at least one destructive operation,
            applying said second firmware setting to said first hardware device without said de-allocating said workload from and said re-allocating said workload to said first hardware device.

6. The system according to claim 5, wherein said instructions are further configured for:
   initiating a boot process in said multiprocessor data processing system.

7. The system according to claim 5, wherein said instructions for said de-allocating said workload from said first hardware device are further configured for:
   de-allocating said first hardware device via a hot-removal procedure.

8. The system according to claim 5, wherein said instructions for said re-allocating said workload to said first hardware device are further configured for:

re-allocating said first hardware device via a hot-plug procedure.

9. A computer-readable storage medium embodying computer program code, said computer program code comprising computer-executable instructions configured for:

updating firmware in a multiprocessor data processing system from a first firmware setting to a second firmware setting; and iteratively applying said second firmware setting to hardware within said multiprocessor data processing system by:

when said second firmware setting includes at least one destructive operation targeted to a first hardware device within said multiprocessor data processing system, de-allocating workload from said first hardware device;

re-allocating said workload to a second hardware device within said multiprocessor data processing system;

performing said destructive operation on said first hardware device;

rebooting said first hardware device; and, when said rebooting said first hardware device is complete, de-allocating said workload from said second hardware device and re-allocating said workload to said first hardware device; and when said second firmware setting does not include at least one destructive operation, applying said second firmware setting to said first hardware device without said de-allocating said workload from and said re-allocating said workload to said first hardware device.

10. The computer-readable storage medium according to claim 9, wherein said embodied computer-program code further comprises computer-executable instructions configured for:

initiating a boot process in said multiprocessor data processing system.

11. The computer-readable storage medium according to claim 9, wherein said embodied computer-program code comprising computer-executable instructions configured for said de-allocating said workload from said first hardware device further comprises computer-executable instructions configured for:

de-allocating said first hardware device via a hot-removal procedure.

12. The computer-readable storage medium according to claim 9, wherein said embodied computer-program code comprising computer-executable instructions configured for said re-allocating said workload to said first hardware device further comprises computer-executable instruction configured for:

re-allocating said first hardware device via a hot-plug procedure.

13. The computer-readable storage medium of claim 9, wherein the computer executable instructions are deployable to a client computer from a server at a remote location.

14. The computer-readable storage medium of claim 9, wherein the computer executable instructions are provided by a service provider to a customer on an on-demand basis.

* * * * *